US012607993B2

(12) United States Patent
Matsushita et al.

(10) Patent No.: US 12,607,993 B2
(45) Date of Patent: Apr. 21, 2026

(54) CONSTRUCTION METHOD OF ABNORMALITY DIAGNOSIS MODEL, ABNORMALITY DIAGNOSIS METHOD, CONSTRUCTION DEVICE OF ABNORMALITY DIAGNOSIS MODEL, AND ABNORMALITY DIAGNOSIS DEVICE

(71) Applicant: JFE STEEL CORPORATION, Tokyo (JP)

(72) Inventors: Masafumi Matsushita, Tokyo (JP); Takehide Hirata, Tokyo (JP); Akira Kumano, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 417 days.

(21) Appl. No.: 18/031,656

(22) PCT Filed: Sep. 21, 2021

(86) PCT No.: PCT/JP2021/034596
§ 371 (c)(1),
(2) Date: Apr. 13, 2023

(87) PCT Pub. No.: WO2022/091639
PCT Pub. Date: May 5, 2022

(65) Prior Publication Data
US 2023/0384780 A1     Nov. 30, 2023

(30) Foreign Application Priority Data
Oct. 27, 2020     (JP) ................................. 2020-179341

(51) Int. Cl.
*G05B 23/02*          (2006.01)
*G06Q 10/0639*     (2023.01)
*G06Q 50/04*         (2012.01)

(52) U.S. Cl.
CPC ... *G05B 23/0243* (2013.01); *G06Q 10/06395* (2013.01); *G06Q 50/04* (2013.01)

(58) Field of Classification Search
None
See application file for complete search history.

(56) References Cited

U.S. PATENT DOCUMENTS

2002/0069044 A1     6/2002   Berg et al.
2019/0012553 A1     1/2019   Maruchi et al.
(Continued)

FOREIGN PATENT DOCUMENTS

CN     109597700 A     4/2019
CN     111191855 A     5/2020
(Continued)

OTHER PUBLICATIONS

Zareipour, Hamidreza, et al. "Application of public-domain market information to forecast Ontario's wholesale electricity prices." IEEE Transactions on Power Systems 21.4 (2006): 1707-1717. (Year: 2006).*
(Continued)

*Primary Examiner* — Carlos R Ortiz Rodriguez
(74) *Attorney, Agent, or Firm* — OLIFF PLC

(57)     ABSTRACT

A construction method of an abnormality diagnosis model for diagnosing an abnormality of a process, the construction method includes: creating a first regression model that sets a regression coefficient regarding an explanatory variable with a small influence on a response variable to zero by using all operational data in normal times collected in advance; dividing the operational data into a plurality of segments determined in advance and determining an explanatory variable candidate for each of the segments within a range of the explanatory variable used in the first regression model; and creating a second regression model
(Continued)

that sets a regression coefficient regarding an explanatory variable candidate with a small influence on a response variable to zero by using the operational data included in the segment.

7 Claims, 3 Drawing Sheets

(56) References Cited

U.S. PATENT DOCUMENTS

| | | | |
|---|---|---|---|
| 2019/0243349 A1 | 8/2019 | Fujitsuka | |
| 2020/0380393 A1* | 12/2020 | Teshima | G06N 20/00 |

FOREIGN PATENT DOCUMENTS

| | | | |
|---|---|---|---|
| EP | 3663741 A1 | 6/2020 | |
| EP | 3663741 B1 | 11/2024 | |
| JP | 2009-54843 A | 3/2009 | |
| JP | 2012-81518 A | 4/2012 | |
| JP | 4922265 B2 | 4/2012 | |
| JP | 5499900 B2 | 5/2014 | |
| JP | 5651998 B2 | 1/2015 | |
| JP | 2019-128904 A | 8/2019 | |
| JP | 2020-149282 A | 9/2020 | |
| WO | 2013/011745 A1 | 1/2013 | |
| WO | 2019/026980 A1 | 2/2019 | |
| WO | 2020/184561 A1 | 9/2020 | |

OTHER PUBLICATIONS

Akkaya, Ilge, et al. "Modeling uncertainty for middleware-based streaming power grid applications." Proceedings of the 8th Workshop on Middleware for Next Generation Internet Computing. 2013. (Year: 2013).*

Vuolio, Tero, et al. "Data-driven mathematical modeling of the effect of particle size distribution on the transitory reaction kinetics of hot metal desulfurization." Metallurgical and Materials Transactions B 49.5 (2018): 2692-2708. (Year: 2018).*

Azimi, Seyed Majid, et al. "Advanced steel microstructural classification by deep learning methods." Scientific reports 8.1 (2018): 2128. (Year: 2018).*

Oct. 6, 2023 Office Action issued in Russian Patent Application No. 2023110559.

V.A. Shterenzon. "Modeling of Technological Processes". 2010, pp. 14, <URL: https://www.rsvpu.ru/filedirectory/3468/shterenzon.pdf>.

Jun. 3, 2024 Office Action issued in Russian Patent Application No. 2023110559.

Jun. 17, 2025 Office Action issued in Chinese Patent Application No. 202180072111.1.

Apr. 9, 2024 Extended Search Report issued in European Patent Application No. 21885758.9.

Jul. 5, 2022 Office Action issued in Japanese Patent Application No. 2022-500007.

Dec. 7, 2021 International Search Report issued in International Patent Application No. PCT/JP2021/034596.

Feb. 12, 2025 Office Action issued in Korean Patent Application No. 10-2023-7012293.

* cited by examiner

FIG.2

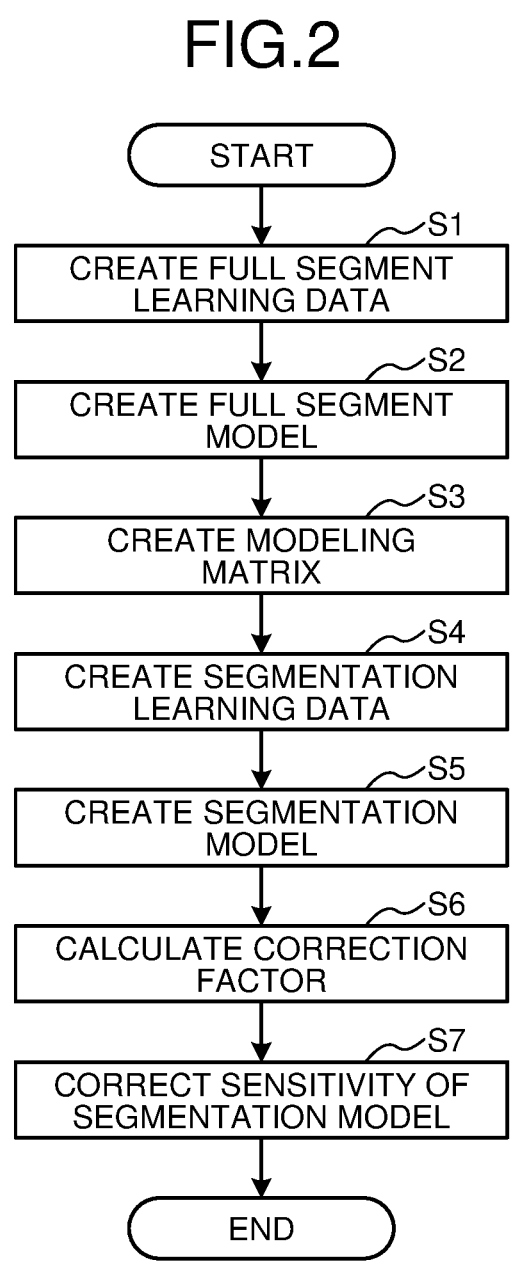

```
          ┌──────────┐
          │  START   │
          └──────────┘
                │
                ▼          ⌇ S1
    ┌───────────────────────┐
    │ CREATE FULL SEGMENT   │
    │    LEARNING DATA      │
    └───────────────────────┘
                │
                ▼          ⌇ S2
    ┌───────────────────────┐
    │  CREATE FULL SEGMENT  │
    │        MODEL          │
    └───────────────────────┘
                │
                ▼          ⌇ S3
    ┌───────────────────────┐
    │   CREATE MODELING     │
    │        MATRIX         │
    └───────────────────────┘
                │
                ▼          ⌇ S4
    ┌───────────────────────┐
    │ CREATE SEGMENTATION   │
    │    LEARNING DATA      │
    └───────────────────────┘
                │
                ▼          ⌇ S5
    ┌───────────────────────┐
    │ CREATE SEGMENTATION   │
    │        MODEL          │
    └───────────────────────┘
                │
                ▼          ⌇ S6
    ┌───────────────────────┐
    │ CALCULATE CORRECTION  │
    │        FACTOR         │
    └───────────────────────┘
                │
                ▼          ⌇ S7
    ┌───────────────────────┐
    │ CORRECT SENSITIVITY OF│
    │  SEGMENTATION MODEL   │
    └───────────────────────┘
                │
                ▼
          ┌──────────┐
          │   END    │
          └──────────┘
```

1

CONSTRUCTION METHOD OF ABNORMALITY DIAGNOSIS MODEL, ABNORMALITY DIAGNOSIS METHOD, CONSTRUCTION DEVICE OF ABNORMALITY DIAGNOSIS MODEL, AND ABNORMALITY DIAGNOSIS DEVICE

FIELD

The present invention relates to a construction method of an abnormality diagnosis model, an abnormality diagnosis method, a construction device of the abnormality diagnosis model, and an abnormality diagnosis device.

BACKGROUND

Methods for diagnosing a manufacturing status of a manufacturing process, especially abnormal situations include a model base approach and a data base approach. The model base approach is an approach to construct a model that represents physical or chemical phenomena in a manufacturing process in terms of numerical formula, and diagnose the manufacturing status of the manufacturing process by using the constructed model. Meanwhile, the data base approach is an approach to construct a statistical analytical model from operational data obtained in the manufacturing process and diagnose the manufacturing status of the manufacturing process by using the constructed model.

In the manufacturing process such as a steel process, since many different types and sizes of product are manufactured in one production line, a large number of operation patterns are present. In the manufacturing process such as a blast furnace, since natural materials such as iron ore and coke are used as raw materials, the manufacturing process has a huge variation. Therefore, when diagnosing the manufacturing status of the manufacturing process such as the steel process, there is a limit in the approach based only on the model base approach.

The data base approach includes a diagnosis method for making the operational data when a past abnormality occurred into a database and determining similarity to the current operational data, and a diagnosis method for conversely making the operational data in normal times into a database and determining the difference between the operational data in normal times and the current operational data. However, in the manufacturing process such as the steel process, the number of facilities used for the manufacturing is large, and especially when there are many aging facilities like in Japan, unprecedented troubles often occur. Therefore, there is a limit in the ability of the former diagnosis method based on past trouble cases to predict abnormal situations.

Meanwhile, the latter diagnosis method (diagnosis method using operational data in normal times) includes methods described in Patent Literatures 1 to 4. Specifically, Patent Literatures 1 and 2 describe methods for predicting or detecting abnormal situations in the manufacturing process based on prediction according to a model created using the operational data in normal times. Patent Literatures 3 and 4 describe methods for detecting unusual situations at an early stage by extracting patterns from the operational data in normal times, making the extracted patterns into a library, and determining the difference between the acquired operational data and the library patterns.

2

CITATION LIST

Patent Literature

Patent Literature 1: WO 2013/011745
Patent Literature 2: Japanese Patent No. 4922265
Patent Literature 3: Japanese Patent No. 5651998
Patent Literature 4: Japanese Patent No. 5499900

SUMMARY

Technical Problem

While the manufacturing process of steel and the like can handle measured values measured by a large number of sensors, many of these measured values are measured for the purpose of operational control and device control. Therefore, as in Patent Literatures 1 to 4, it is not always possible to acquire sufficient measured values that directly indicate the facility status or the cause of abnormality. Even if there is a measured value corresponding one-to-one to such a cause of abnormality, the situation is that it is far from possible to cover all abnormalities only with the measured value.

Meanwhile, recent development in data collection and analysis technology have created an environment for handling a large amount of data referred to as 'big data'. In view of the above-described situation, it can be said that detecting an abnormal situation from the large amount of data in a comprehensive and accurate manner, presenting data related to an abnormality, and leading to prompt maintenance action are necessary for maintaining stable operations. In this case, the large amount of data does not necessarily correspond one-to-one to the cause of abnormality such as in Patent Literatures 1 to 4, and therefore the technology to detect subtle behavioural changes in the large amount of data is needed.

Meanwhile, in the steel manufacturing process and the like, a large variety of products are manufactured through a plurality of manufacturing processes. In the abnormality diagnosis of such a complicated process, no single abnormality diagnosis model can be applied to all varieties. For example, to ensure accuracy of diagnosis, it is usual to apply a diagnosis model grouped by product information such as variety and physical characteristics (hereinafter referred to as "segmentation").

However, the diagnostic accuracy can be improved by segmentation only when there is a sufficient number of learning samples (number of learning data), and it is difficult to construct an appropriate abnormality diagnosis model in rare varieties that have a small production share. Even if the abnormality diagnosis model can be constructed, there is a problem of large variations in sensitivity of the abnormality diagnosis model to an actual abnormality due to the small number of learning samples.

The present invention has been made in view of the above situation, and an object of the present invention is to provide a construction method of an abnormality diagnosis model, an abnormality diagnosis method, an construction device of an abnormality diagnosis model, and an abnormality diagnosis device that can construct an appropriately segmented abnormality diagnosis model with small variations in sensitivity to actual abnormalities while ensuring diagnostic accuracy in a rare segment with a small number of learning samples.

Solution to Problem

To solve the problem and achieve the object, a construction method of an abnormality diagnosis model for diagnosing an abnormality of a process, according to the present invention, includes: a first regression model creation step of creating a first regression model that sets a regression coefficient regarding an explanatory variable with a small influence on a response variable to zero by using all operational data in normal times collected in advance; an explanatory variable candidate determination step of dividing the operational data into a plurality of segments determined in advance and determining an explanatory variable candidate for each of the segments within a range of the explanatory variable used in the first regression model; and a second regression model creation step of creating a second regression model that sets a regression coefficient regarding an explanatory variable candidate with a small influence on a response variable to zero by using the operational data included in the segment.

Moreover, the construction method of an abnormality diagnosis model according to the present invention further includes, after the second regression model creation step: a correction factor calculation step of calculating, for each of the segments, a correction factor that is a ratio of a variation index of a prediction error of the second regression model for each of the segments to a variation index of a prediction error of the first regression model; and a sensitivity correction step of correcting the prediction error of the second regression model for each of the segments by the correction factor.

Moreover, the construction method of an abnormality diagnosis model according to the present invention further includes, after the second regression model creation step: a correction factor calculation step of calculating, for each of the segments, a correction factor that is a ratio of a variation index of a prediction error of the second regression model for each of the segments constructed from a second learning data set different from the first learning data set to a variation index of a prediction error of the second regression model for each of the segments constructed from a first learning data set; and a sensitivity correction step of correcting the prediction error of the second regression model for each of the segments by the correction factor.

Moreover, in the construction method of an abnormality diagnosis model according to the present invention, the plurality of segments include a product variety, a product size, an operating condition, and an operating pattern.

Moreover, in the construction method of an abnormality diagnosis model according to the present invention, the first regression model creation step includes creating the first regression model by Lasso regression, and the second regression model creation step includes creating the second regression model by the Lasso regression.

Moreover, an abnormality diagnosis method according to the present invention is a method of using the abnormality diagnosis model constructed by the construction method of the abnormality diagnosis model according to the present invention. The abnormality diagnosis method includes: an abnormality diagnosis step of calculating an abnormality index by using a second regression model according to a segment of operational data to be diagnosed; and an abnormality determination step of determining whether or not there is an abnormality based on the abnormality index.

Moreover, a construction device of an abnormality diagnosis model for diagnosing an abnormality of a process, according to the present invention, includes: a first regression model creation means for creating a first regression model that sets a regression coefficient regarding an explanatory variable with a small influence on a response variable to zero by using all operational data in normal times collected in advance; an explanatory variable candidate determination means for dividing the operational data into a plurality of segments determined in advance and determines an explanatory variable candidate for each of the segments within a range of the explanatory variable used in the first regression model; and a second regression model creation means for creating a second regression model that sets a regression coefficient regarding an explanatory variable candidate with a small influence on a response variable to zero by using the operational data included in the segment.

Moreover, an abnormality diagnosis device according to the present invention is a device using the abnormality diagnosis model constructed by the construction device of the abnormality diagnosis model according to the present invention. The abnormality diagnosis device includes: an abnormality diagnosis means for calculating an abnormality index by using a second regression model according to a segment of operational data to be diagnosed; and an abnormality determination means for determining whether or not there is an abnormality based on the abnormality index.

Advantageous Effects of Invention

The construction method of an abnormality diagnosis model, the abnormality diagnosis method, the construction device of the abnormality diagnosis model, and the abnormality diagnosis device according to the present invention create a regression model for each segment by using an explanatory variable within the range of the explanatory variable used in the full segment regression model. This allows the construction of an appropriately segmented abnormality diagnosis model with small variations in sensitivity to actual abnormalities while ensuring diagnostic accuracy in a rare segment with the small number of learning samples.

BRIEF DESCRIPTION OF DRAWINGS

FIG. 2 is a flowchart illustrating a procedure of a model construction method executed by the model construction device according to the embodiment of the present invention.

DESCRIPTION OF EMBODIMENTS

A construction method of an abnormality diagnosis model, an abnormality diagnosis method, a construction device of the abnormality diagnosis model, and an abnormality diagnosis device according to an embodiment of the present invention will be described with reference to the drawings.

[Abnormality Diagnosis Device/Model Construction Device]

Figure 1:
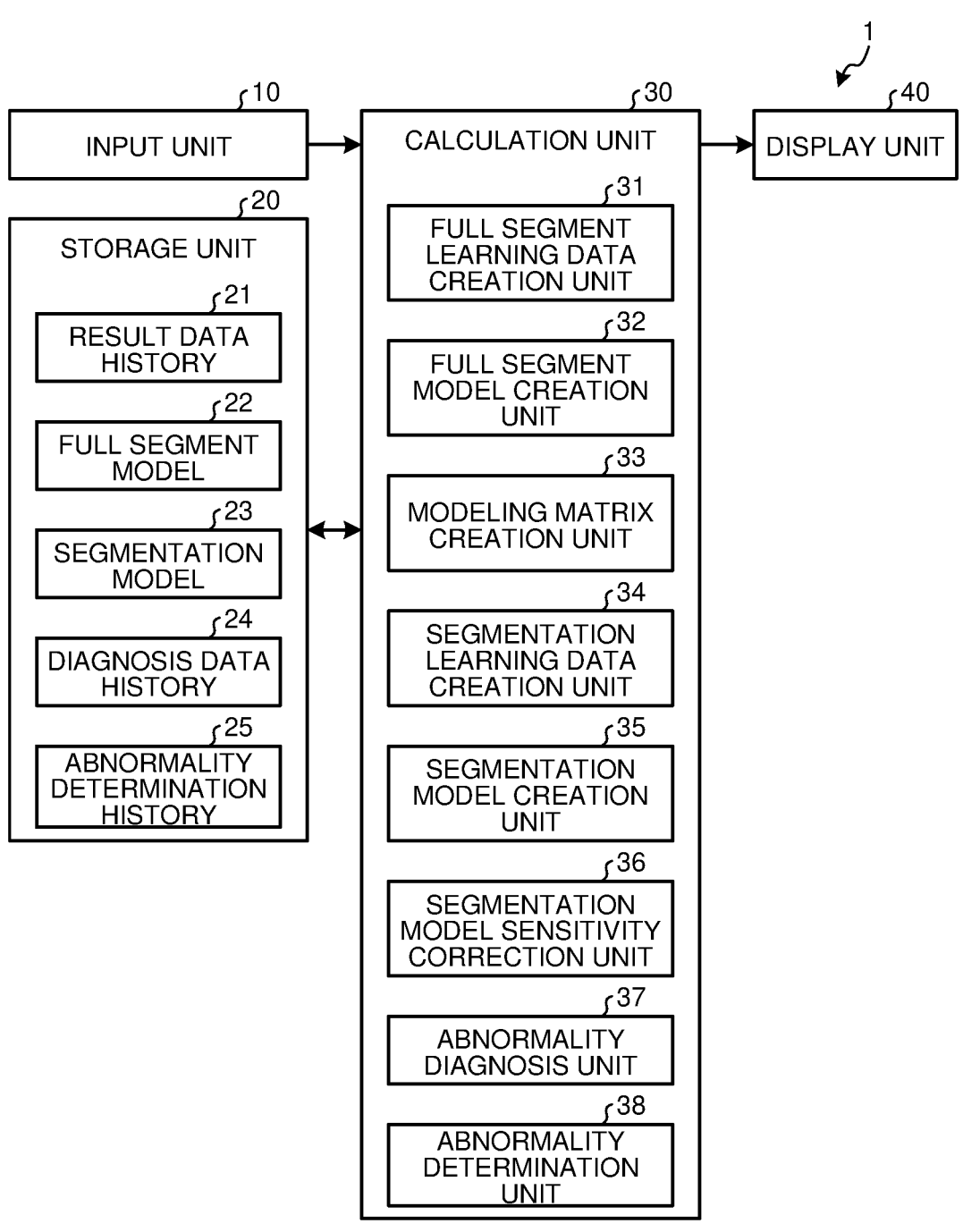
FIG. 1 is a diagram illustrating a schematic configuration of an abnormality diagnosis device and a model construction device according to an embodiment of the present invention.

To begin with, the configuration of the abnormality diagnosis device and the construction device of the abnormality diagnosis model according to the embodiment of the present invention (hereinafter referred to as "model construction device") will be described with reference to FIG. 1. The abnormality diagnosis device is a device for diagnosing process abnormalities in a plant or the like, whereas the model construction device is a device for constructing a model for abnormality diagnosis.

An abnormality diagnosis device 1 includes an input unit 10, a storage unit 20, a calculation unit 30, and a display unit 40. Note that out of components of the abnormality diagnosis device 1, the "model construction device" is implemented by components other than a diagnosis data history 24, an abnormality determination history 25, an abnormality diagnosis unit 37, and an abnormality determination unit 38.

The input unit 10 is an input means for the calculation unit 30, receives operational data of a facility to be diagnosed (for example, sensor data) via an information and control system network, and inputs the received operational data into the calculation unit 30 in a predetermined format.

The storage unit 20 includes a recording medium such as an erasable programmable ROM (EPROM), a hard disk drive (HDD), and a removable media. Examples of the removable media include a universal serial bus (USB) memory, and a disk storage medium such as a compact disc (CD), a digital versatile disc (DVD), and a Blu-ray (registered trademark) disc (BD). The storage unit 20 can store an operating system (OS), various programs, various tables, various databases, and the like.

The storage unit 20 stores a result data history 21, a full segment model (first regression model) 22, a segmentation model (second regression model) 23, the diagnosis data history 24, and the abnormality determination history 25.

The result data history 21 is information about operational data (result data) collected by the system. The full segment model 22 is a model created by a full segment model creation unit 32 based on the operational data. The segmentation model 23 is a model created by a segmentation model creation unit 35 based on the result data. Abnormality diagnosis by the abnormality diagnosis unit 37 is executed using the segmentation model 23. Examples of the segmentation model 23 include a model that physically predicts a process state amount or the like and a statistically constructed model.

The diagnosis data history 24 is information about an abnormality diagnosis result by the abnormality diagnosis unit 37. The abnormality determination history 25 is information about an abnormality determination result by the abnormality determination unit 38. Note that in addition to these pieces of information, the storage unit 20 also stores various settings required for the operation of the system and the like as necessary.

The calculation unit 30 is implemented, for example, by a processor including a central processing unit (CPU) or the like, a memory (main storage unit) including a random access memory (RAM), a read only memory (ROM), and the like.

The calculation unit 30 implements a function that meets a predetermined purpose by loading a program into a work area of the main storage unit, executing the program, and controlling each component and the like through the execution of the program. The calculation unit 30 functions as a full segment learning data creation unit 31, the full segment model creation unit (first regression model creation means) 32, a modeling matrix creation unit 33, and a segmentation learning data creation unit 34 through the execution of the above-described program. In addition, the calculation unit 30 functions as the segmentation model creation unit (second regression model creation means) 35, a segmentation model sensitivity correction unit 36, the abnormality diagnosis unit (abnormality diagnosis means) 37, and the abnormality determination unit (abnormality determination means) 38 through the execution of the above-described program. Note that FIG. 1 illustrates an example in which functions of each unit are implemented, for example, by one computer, but the means for implementing functions of each unit is not particularly limited. For example, a plurality of computers may implement functions of each unit.

The full segment learning data creation unit 31 creates learning data for constructing the full segment model 22. The full segment learning data creation unit 31 refers to operational data necessary for model construction from the result data history 21, normalizes the operational data to a format suitable for learning data, and creates the full segment learning data.

The full segment model creation unit 32 creates the full segment model 22 based on the full segment learning data created by the full segment learning data creation unit 31. The full segment model creation unit 32 creates the full segment model 22 such that a regression coefficient about an explanatory variable with a small influence on a response variable is 0 by using all the operational data in normal times collected in advance. Then, the full segment model creation unit 32 saves the created full segment model 22 in the storage unit 20.

Here, the present embodiment will describe an example of constructing the full segment model 22 by sparse structure learning by Lasso regression. Using Lasso regression makes it possible to extract important factors from a large amount of data and create a model that can be explained. In Lasso regression, when the response variable is y, the explanatory variable is $x_i$, and the regression coefficient is $a_i$, the regression coefficient $a_i$ is determined that minimizes the weighted sum of the sum of the squares of a prediction error and the absolute values of the regression coefficient $a_i$, as illustrated in the following Formula (1).

$$\min_{a} \left[ \left( y - \sum_i a_i x_i \right)^2 + \lambda \sum_i |a_i| \right] \quad (1)$$

In Formula (1) described above, $\lambda$ is a hyperparameter that specifies the weight of the first and second terms in the weighted sum, and is a fixed value or can also be searched by varying in a predetermined range. The main feature of Lasso regression is derived from the second term of Formula (1) described above. That is, the regression coefficient $a_i$ with a small influence on the prediction error is positively set to 0, which has the effect of sparsification. This effect makes it possible to select the explanatory variable and extract the influence (influence coefficient) together.

The modeling matrix creation unit 33 creates data for defining structure of the segmentation model 23 described later (modeling matrix) based on structure of the full segment model 22 created by the full segment model creation unit 32. The modeling matrix creation unit 33 specifically creates data about "$\gamma_i$" in Formula (3) described later.

The segmentation learning data creation unit 34 creates learning data for constructing the segmentation model 23. The segmentation learning data creation unit 34 refers to the operational data necessary for model construction from the result data history 21, and executes segmentation for dividing the operational data into a plurality of predetermined segments. Examples of the plurality of segments include varieties of product to be manufactured (steel type for steel product), product type, product size, operating conditions, and operating patterns. In addition to the varieties of product described above and the like, the segmentation learning data creation unit 34 may execute segmentation based on product groups and the like that can be classified from physical and other findings.

The segmentation model creation unit 35 creates the segmentation model 23 based on segmentation learning data created by the segmentation learning data creation unit 34 and the modeling matrix created by the modeling matrix creation unit 33. The segmentation model creation unit 35 creates the segmentation model 23 such that the regression coefficient about an explanatory variable candidate with a small influence on the response variable is 0 by using the operational data included in the above-described segment. Then, the segmentation model creation unit 35 saves the created segmentation model 23 in the storage unit 20.

Here, the present embodiment will describe an example of constructing the segmentation model 23 by the sparse structure learning by Lasso regression in a similar manner to the full segment model 22.

In the creation of the segmentation model 23 by the segmentation model creation unit 35, the important explanatory variable is limited based on structure of the full segment model 22 created by the full segment learning data with a large N number (number of learning samples (number of learning data)). Then, selection of the explanatory variable from the restricted explanatory variables and determination of the regression coefficient are executed using the segmentation learning data. That is, the segmentation model creation unit 35 determines the explanatory variable candidate to be used in the segmentation model 23 within the range of the explanatory variable used in the full segment model 22. With this operation, even in the segmentation learning data with a small N number, by reducing the number of variables to determine, model prediction accuracy can be ensured.

The parameter search in the segmentation model 23 by the segmentation model creation unit 35 can be illustrated, for example, as in the following Formula (2).

$$\min_{w}\left[\left(y - \sum_{i}\gamma_i w_i x_i\right)^2 + \lambda\sum_{i}|\gamma_i w_i|\right] \qquad (2)$$

In Formula (2) above, y is the response variable, $\gamma_i$ is a coefficient for setting the upper limit of the explanatory variable (explanatory variable candidate) obtained from the selection of the explanatory variable of the full segment model 22, $w_i$ is a regression coefficient in the segmentation model 23, and $x_i$ is an explanatory variable.

Specifically, as illustrated in the following Formula (3), $\gamma_i$ in Formula (2) above is 1 for variables selected as the explanatory variable in the full segment model 22, and is 0 otherwise.

$$\gamma_i = \begin{cases} 0 & (a_i = 0) \\ 1 & (\text{otherwise}) \end{cases} \qquad (3)$$

The regression model determined by the above Formula (2) (second regression model) has a structure in which the explanatory variable is further limited (may be the same explanatory variable in some cases) with the explanatory variable of the regression model determined by the above Formula (1) (first regression model) as an upper limit. The regression coefficient $w_i$ of the explanatory variable selected in the regression model determined by the above Formula (2) (influence, influence coefficient) is determined from the segmentation learning data only.

The segmentation model sensitivity correction unit 36 corrects sensitivity of the segmentation model 23 created by the segmentation model creation unit 35. Here, in the abnormality determination using the size of the prediction error of the regression model as an abnormality scale (hereinafter referred to as "abnormality index"), a method for calculating the abnormality index by using distribution of the prediction error in normal times is often used. For example, this is a method for setting the ratio of the dispersion of the prediction error in normal times to the square of the prediction error as the abnormality index or the like. By using this method, it is possible to give probabilistic meaning to the abnormality index.

Meanwhile, in the segmentation model 23 with the small N number (number of learning samples (number of learning data)) that is the target of the present embodiment, the distribution of the prediction error has potential to deviate from the true distribution due to insufficient N number. This means that the sensitivity of the calculated abnormality index fluctuates.

Therefore, by correcting the sensitivity of the segmentation model 23, the segmentation model sensitivity correction unit 36 unifies the scale of the abnormality index among the segment models. When the abnormality index is expressed as the ratio of the dispersion of the prediction error in normal times to the square of the prediction error, the segmentation model sensitivity correction unit 36 specifically calculates a correction factor $\beta$ for each segment of the segmentation model 23, as illustrated in the following Formula (4). This correction factor $\beta$ is the ratio of the variation index of the prediction error of the segmentation model 23 to the variation index of the prediction error of the full segment model 22 (for example, dispersion, standard deviation).

$$\beta = \frac{N_{inc}\sum_{j_1=1}^{N_{ex}}\left(y_{j_1} - \sum_{i}\gamma_i w_i x_{ij_1}\right)^2}{N_{ex}\sum_{j_0=1}^{N_{inc}}\left(y_{j_0} - \sum_{i}a_i x_{ij_0}\right)^2} \qquad (4)$$

In the above Formula (4), the denominator is dispersion of the prediction error of the full segment model 22, whereas the numerator is dispersion of the prediction error of the segmentation model 23.

When changing the learning data for model construction or the like, even when correcting the model sensitivity before and after the change, the approach similar to the above Formula (4) can be applied. In this case, the correction factor $\beta$ can be calculated from the ratio with the variation index of the prediction error of the segmentation model 23 in the past as a denominator and the variation index of the prediction error of the segmentation model 23 to be newly introduced as a numerator That is, the correction factor $\beta$ is calculated for each segment from the ratio of the variation index of the prediction error of the segmentation model 23 constructed from the second learning data set to the variation index of the prediction error of the segmentation model 23 constructed from the first learning data set (segmentation learning data). The first learning data set and the second learning data set are learning data sets different from each other. The first learning data set is, for example, a learning data set used when constructing the segmentation model 23 in the past, whereas the second learning data set is, for example, a learning data set used when constructing a newly introduced segmentation model 23.

Subsequently, the segmentation model sensitivity correction unit 36 corrects the prediction error of the segmentation model 23 for each segment by the correction factor β. In the present embodiment, since the full segment model 22 is constructed in advance, by matching the scale of the abnormality index calculated by the segmentation model 23 with the scale of the full segment model 22, it is possible to eliminate variations in sensitivity between segments.

The abnormality diagnosis unit 37 calculates the abnormality index such as the degree of abnormality and the degree of deviation by using the segmentation model 23 according to the segment of the operational data to be diagnosed. The abnormality diagnosis unit 37 inputs, for example, the operational data for diagnosis extracted from the result data history 21 into the segmentation model 23, and calculates the size of the error (prediction error) between the predicted value by the segmentation model 23 and the corresponding measured value as an abnormality index. Then, the abnormality diagnosis unit 37 saves the calculated abnormality index in the storage unit 20 as the diagnosis data history 24.

The abnormality determination unit 38 determines whether or not there is an abnormality based on the abnormality index calculated by the abnormality diagnosis unit 37. Then, the abnormality determination unit 38 saves the determination result as the abnormality determination history 25 in the storage unit 20. The abnormality determination unit 38 outputs the determination result to the display unit 40.

The display unit 40 is implemented, for example, by a display device such as an LCD display or a CRT display. The display unit 40 displays, for example, the diagnosis result by the abnormality diagnosis unit 37, the determination result by the abnormality determination unit 38, and the like based on a display signal input from the calculation unit 30, thereby providing guidance to an operator.

[Model Construction Method]

The model construction method by the model construction device according to the embodiment of the present invention will be described with reference to FIG. 2. The model construction method is executed offline at arbitrary timing.

To begin with, the full segment learning data creation unit 31 creates the full segment learning data based on the operational data stored in the result data history 21 (step S1). Subsequently, the full segment model creation unit 32 creates the full segment model 22 by Lasso regression based on the full segment learning data (step S2).

Subsequently, the modeling matrix creation unit 33 creates the modeling matrix based on the structure of the full segment model 22 (step S3). Subsequently, the segmentation learning data creation unit 34 creates the segmentation learning data based on the operational data stored in the result data history 21 (step S4). Subsequently, the segmentation model creation unit 35 creates the segmentation model 23 by Lasso regression based on the segmentation learning data and the modeling matrix (step S5).

Subsequently, the segmentation model sensitivity correction unit 36 calculates the correction factor β for correcting the prediction error of the segmentation model 23 by Formula (4) above (step S6). Subsequently, the segmentation model sensitivity correction unit 36 corrects the prediction error of the segmentation model 23 for each segment by the correction factor β (step S7), and ends this process.

[Abnormality Diagnosis Method]

Figure 3:
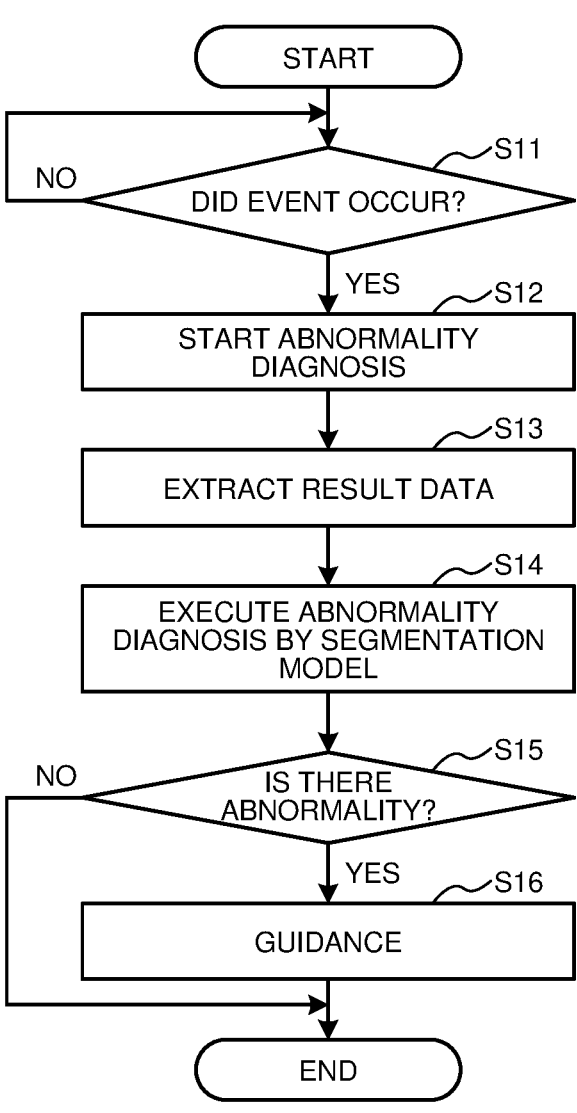
FIG. 3 is a flowchart illustrating a procedure of an abnormality diagnosis method executed by the abnormality diagnosis device according to the embodiment of the present invention.

The abnormality diagnosis method by the abnormality diagnosis device 1 according to the embodiment of the present invention will be described with reference to FIG. 3. The abnormality diagnosis method is executed online during the operation.

To begin with, the abnormality diagnosis unit 37 determines whether an event occurred (step S11). In step S11, the occurrence of an event to be diagnosed is detected based on the operational data collected by the system. For example, when diagnosing the entire manufacturing process, the occurrence of an event can be detected by monitoring a flag signal indicating the start and end of the manufacturing process, and the like.

When it is determined that no event has occurred (No in step S11), the abnormality diagnosis unit 37 returns to step S11. Meanwhile, when it is determined that an event occurred (Yes in step S11), the abnormality diagnosis unit 37 starts the abnormality diagnosis (step S12), and extracts the required amount of result data to be diagnosed (operational data) from the result data history 21 (step S13). Subsequently, the abnormality diagnosis unit 37 executes the abnormality diagnosis by the segmentation model 23 (step S14).

Subsequently, the abnormality determination unit 38 determines whether or not there is an abnormality based on the abnormality index calculated by the abnormality diagnosis unit 37 in step S14 (step S15). When it is determined that there is an abnormality (Yes in step S15), the abnormality determination unit 38 displays the determination results on the display unit 40, thereby providing guidance to the operator (step S16). Then, the abnormality determination unit 38 ends this process and transitions to the initial state of waiting for events. Note that when it is determined in step S15 that there is no abnormality (No in step S15), the abnormality determination unit 38 ends this process and transitions to the initial state of waiting for events.

In the construction method of the abnormality diagnosis model, the abnormality diagnosis method, the construction device of the abnormality diagnosis model, and the abnormality diagnosis device 1 according to the embodiment described above, the following process is executed when constructing the segmentation model 23 obtained by segmenting the variety, physical characteristics, and the like of the product in question. To begin with, the full segment model 22 is constructed from the full segment learning sample. Then, in the full segment model 22, the segmentation model 23 is constructed based on the learning sample that is segmented with the explanatory variable with a large influence as an upper limit.

In this way, the segmentation model 23 is created using the explanatory variable within the range of the explanatory variable used in the full segment model 22. This allows the construction of an appropriately segmented abnormality diagnosis model with small variations in sensitivity to actual abnormalities while ensuring diagnostic accuracy in a rare segment with the small number of learning samples.

In the construction method of the abnormality diagnosis model, the abnormality diagnosis method, the construction device of the abnormality diagnosis model, and the abnormality diagnosis device 1 according to the embodiment, the output of the segmentation model 23 is corrected by the correction factor β such that the sensitivity matches with the full segment model 22 when the segmentation model 23 is constructed. In this way, by matching the scale of the abnormality index calculated by the segmentation model 23 with the scale of the full segment model 22, it is possible to eliminate variations in sensitivity between segments.

In the construction method of the abnormality diagnosis model, the abnormality diagnosis method, the construction device of the abnormality diagnosis model, and the abnormality diagnosis device 1 according to the embodiment, the output of the newly mounted segmentation model 23 is corrected by the correction factor β such that the sensitivity matches with the segmentation model 23 in the past when the segmentation model 23 is updated. In this way, by matching the scale of the abnormality index calculated by the segmentation model 23 before and after the model update, it is ensured that the sensitivity does not change due to the model update. This allows parameters using the abnormality diagnosis results, such as warning thresholds, to be used without change.

The construction method of the abnormality diagnosis model, the abnormality diagnosis method, the construction device of the abnormality diagnosis model, and the abnormality diagnosis device 1 according to the present invention have been specifically described below by means of modes and examples for carrying out the invention. However, the spirit of the present invention is not limited to these descriptions and needs be interpreted broadly based on the claims. It is needless to say that various changes, modifications, and the like based on these descriptions are also included in the spirit of the present invention.

For example, in the construction method of the abnormality diagnosis model, the abnormality diagnosis method, the construction device of the abnormality diagnosis model, and the abnormality diagnosis device 1 according to the embodiment, calculation of the correction factor β and sensitivity correction of the segmentation model 23 have been executed offline when creating the segmentation model 23 (see steps S6 and S7 in FIG. 2), but may also be executed online at the time of abnormality diagnosis. In this case, for example, in step S14 of FIG. 3, calculation of the correction factor β and sensitivity correction of the segmentation model 23 can be executed.

REFERENCE SIGNS LIST

1 ABNORMALITY DIAGNOSIS DEVICE
10 INPUT UNIT
20 STORAGE UNIT
21 RESULT DATA HISTORY
22 FULL SEGMENT MODEL
23 SEGMENTATION MODEL
24 DIAGNOSIS DATA HISTORY
25 ABNORMALITY DETERMINATION HISTORY
30 CALCULATION UNIT
31 FULL SEGMENT LEARNING DATA CREATION UNIT
32 FULL SEGMENT MODEL CREATION UNIT
33 MODELING MATRIX CREATION UNIT
34 SEGMENTATION LEARNING DATA CREATION UNIT
35 SEGMENTATION MODEL CREATION UNIT
36 SEGMENTATION MODEL SENSITIVITY CORRECTION UNIT
37 ABNORMALITY DIAGNOSIS UNIT
38 ABNORMALITY DETERMINATION UNIT
40 DISPLAY UNIT

The invention claimed is:

1. An abnormality diagnosis method for diagnosing an abnormality of a steel manufacturing process, the method comprising:

creating a first regression model that sets a regression coefficient regarding an explanatory variable with a small influence on a response variable to zero by using all operational data in normal times collected in advance;

dividing the operational data into a plurality of segments determined in advance and determining an explanatory variable candidate for each of the segments within a range of the explanatory variable used in the first regression model, wherein the plurality of segments include a product variety, a product size, an operating condition, and an operating pattern;

creating a second regression model that sets a regression coefficient regarding an explanatory variable candidate with a small influence on a response variable to zero by using the operational data included in the segment;

receiving the operational data including sensor data from a facility performing the steel manufacturing process via an information and control system network;

calculating an abnormality index by using a second regression model according to a segment of the received operational data to be diagnosed;

determining whether or not there is an abnormality based on the abnormality index;

displaying the determination result to provide guidance to an operator for stable operation; and performing maintenance based on the determination result for the stable operation.

2. The method according to claim 1, further comprising, after creating the second regression model:

calculating, for each of the segments, a correction factor that is a ratio of a variation index of a prediction error of the second regression model for each of the segments to a variation index of a prediction error of the first regression model; and correcting the prediction error of the second regression model for each of the segments by the correction factor.

3. The method according to claim 1, further comprising, after creating the second regression model:

calculating, for each of the segments, a correction factor that is a ratio of a variation index of a prediction error of the second regression model for each of the segments constructed from a second learning data set different from the first learning data set to a variation index of a prediction error of the second regression model for each of the segments constructed from a first learning data set; and correcting the prediction error of the second regression model for each of the segments by the correction factor.

4. The method according to claim 1, wherein creating the first regression model includes creating the first regression model by Lasso regression, and creating the second regression model includes creating the second regression model by the Lasso regression.

5. The method according to claim 2, wherein creating the first regression model includes creating the first regression model by Lasso regression, and creating the second regression model includes creating the second regression model by the Lasso regression.

6. The method according to claim 3, wherein creating the first regression model includes creating the first regression model by Lasso regression, and creating the second regression model includes creating the second regression model by the Lasso regression.

7. An abnormality diagnosis device for diagnosing an abnormality of a steel manufacturing process, the device comprising:

a first regression model creation means for creating a first regression model that sets a regression coefficient regarding an explanatory variable with a small influence on a response variable to zero by using all operational data in normal times collected in advance;

an explanatory variable candidate determination means for dividing the operational data into a plurality of segments determined in advance and determines an explanatory variable candidate for each of the segments within a range of the explanatory variable used in the first regression model, wherein the plurality of segments include a product variety, a product size, an operating condition, and an operating pattern;

a second regression model creation means for creating a second regression model that sets a regression coefficient regarding an explanatory variable candidate with a small influence on a response variable to zero by using the operational data included in the segment;

an input unit for receiving the operational data including sensor data from a facility performing the steel manufacturing process via an information and control system network;

an abnormality diagnosis means for calculating an abnormality index by using a second regression model according to a segment of the received operational data to be diagnosed;

an abnormality determination means for determining whether or not there is an abnormality based on the abnormality index; and a display unit for displaying the determination result to provide guidance to an operator for stable operation, wherein maintenance is performed based on the determination result for the stable operation.

\* \* \* \* \*